United States Patent [19]

Braun et al.

[11] 3,736,382

[45] May 29, 1973

[54] SERIALLY CONTENT ADDRESSABLE MEMORY CONTROLLED CALL FORWARDING SYSTEM

[75] Inventors: Edwin Julius Braun; Roderic Romero, both of Boulder, Colo.

[73] Assignee: Bell Telephone Laboratories Incorporated, Murray Hill, N.J.

[22] Filed: Oct. 15, 1971

[21] Appl. No.: 189,597

[52] U.S. Cl. ....179/18 BE, 179/18 ES

[51] Int. Cl. ....H04m 3/54

[58] Field of Search ....179/18 BE, 18 B, 179/18 ES

[56] References Cited

UNITED STATES PATENTS

| | | | |
|---|---|---|---|
| 3,668,330 | 6/1972 | Hemdal | 179/18 ES |
| 3,626,105 | 12/1971 | De Jean et al. | 179/18 ES |
| 3,626,109 | 12/1971 | Bartlett et al | 179/18 BE |

*Primary Examiner*—Thomas W. Brown
*Attorney*—W. L. Keefauver

[57] ABSTRACT

A call forwarding arrangement for use in a telephone switching system wherein a call directed to a base station may be established to a remote station arbitrarily chosen by either the base or an attendant station user. Base station and attendant station users are each enabled to dial remote station directory numbers into a digit register. Digital pulse trains representing the registered remote station number are serially read into an idle remote station store of a content addressable memory. Additional pulse trains representing the digits of the base station number are serially read into a base station store associated with the remote station store. The memory is interrogated by simultaneously comparing the serial digital pulse trains of a called station number with serial digit pulse trains read from every base station store. On a pulse match condition digital pulse trains are serially read from the remote station store associated with the matched base station store into the telephone switching system in order that a call may be established to the chosen remote station.

20 Claims, 10 Drawing Figures

STORE CONTROL 15

SERIALLY CONTENT ADDRESSABLE MEMORY CONTROLLED CALL FORWARDING SYSTEM

BACKGROUND OF THE INVENTION

1. Field of the Invention

This invention concerns switching systems. In particular it relates to a memory activated common control switching system. In a still more particular aspect this invention relates to a memory for use in a call forwarding arrangement wherein a connection directed to a station may be completed to another station arbitrarily preselected by the first station.

2. Description of the Prior Art

The extensive development of switching systems in recent years has made possible the provision of numerous special features which render switching systems more convenient and more flexible. For example, circuit arrangements have been provided whereby a connection directed to a base station of a switching system may be completed to a remote station arbitrarily preselected by the base station user.

A specific example of the desirability of a switching system arranged to provide this type of call forwarding feature is disclosed in the call forwarding system set forth by T. R. Stevens in U.S. Pat. No. 3,544,729 dated Dec. 1, 1970. The Stevens patent, although a substantial contribution to prior art switching system arrangements, highlights the deficiency of the existing art in the area of call forwarding systems. The Stevens disclosure teaches the use of a switching system central memory arranged with a plurality of address locations each exclusively associated with a station served by the switching system and each addressable by the parallel coded line equipment location of the respective station. When a base station user of the Stevens system desires to have incoming calls transferred to a remote station the equipment location of the base station and the remote station number are extended over a plurality of parallel leads from a register to the central memory. The central memory utilized by the Stevens call forwarding system may advantageously be a magnetic drum memory having a plurality of storage locations each assigned an address location and each identified by the equipment location recorded in a parallel code format in the address location. In this type of memory circuit the rotating drum compares the base station equipment location received over parallel leads from the register with the equipment locations recorded in each of the address locations. When the drum memory has located an address location, having stored therein an equipment location matching the received equipment location, parallel coded information is written into or read out of the associated storage location over additional parallel leads extending from the memory drum to control circuitry.

The problem of sequentially searching through a plurality of memory address locations to find a stored remote station number may be solved by utilizing a content addressable memory as the central memory of the aforementioned Stevens system. A typical memory circuit of this type comprises a memory matrix having horizontal rows of address and associated storage locations made up of vertical columns of information bits wherein the base station equipment locations and remote station numbers may be stored. This type of memory circuit may be interrogated by transmitting the base station equipment location over a plurality of parallel leads each assoiated with one of the vertical columns located in the horizontal row storage areas assigned as address locations. Upon the receipt of the base station equipment location all memory address locations are simultaneously interrogated. When one address location is matched the information recorded in the associated storage area is read in or out of the memory matrix over additional parallel leads extending between the central memory and control circuitry.

Although the call forwarding system disclosed by Stevens is a substantial contribution to the technology, it must be recognized that a multitude of parallel leads must be extended from the switching system to the central memory during every interrogating, read, and write sequence in order that parallel binary coded information may be read into and from the central memory. It must also be recognized that it is highly desirable that all central memory address locations be available for use by every base station and that all central memory address locations be simultaneously addressable by stations wishing to establish connections to users normally located at base stations.

Accordingly, a need exists in the art for a call forwarding system having a central memory arranged to serially transfer binary coded information to and from a common control switching system over single leads. A need also exists for a central memory capable of storing binary coded information in any memory storage location and for utilizing serially received information to simultaneously interrogate all memory storage locations.

SUMMARY OF THE INVENTION

In the exemplary embodiment a call forwarding system for completing a connection directed to a base station to a remote station arbitrarily preselected by a base station or attendant station user is provided with a central memory arranged with a plurality of cyclic address counters and associated cyclic storage counters each having a fixed number of counting states. The central memory is arranged to record serial pulse trains representing remote station numbers and base station numbers in counting states of idle ones of the storage and address counters respectively. On all calls completing to base stations the central memory is interrogated by simultaneously cycling every address counter from the recorded number counting states through the fixed number of counting states. Pulse trains initiated by the advancement of the address counters through an initial counting state back to the recorded base number counting state are simultanously gated into comparison gates with serial pulse trains representing the called base station number. Upon a serial match condition pulse trains identifying the preselected remote station are serially read from the storage counter associated with the matched address counter in order that the incoming station connection directed to the base station may be established to the preselected remote station.

DESCRIPTION OF THE DRAWING

The foregoing objects and advantages, as well as others of the invention, will be more apparent from a description of the drawing in which.

Figures 1, 10:
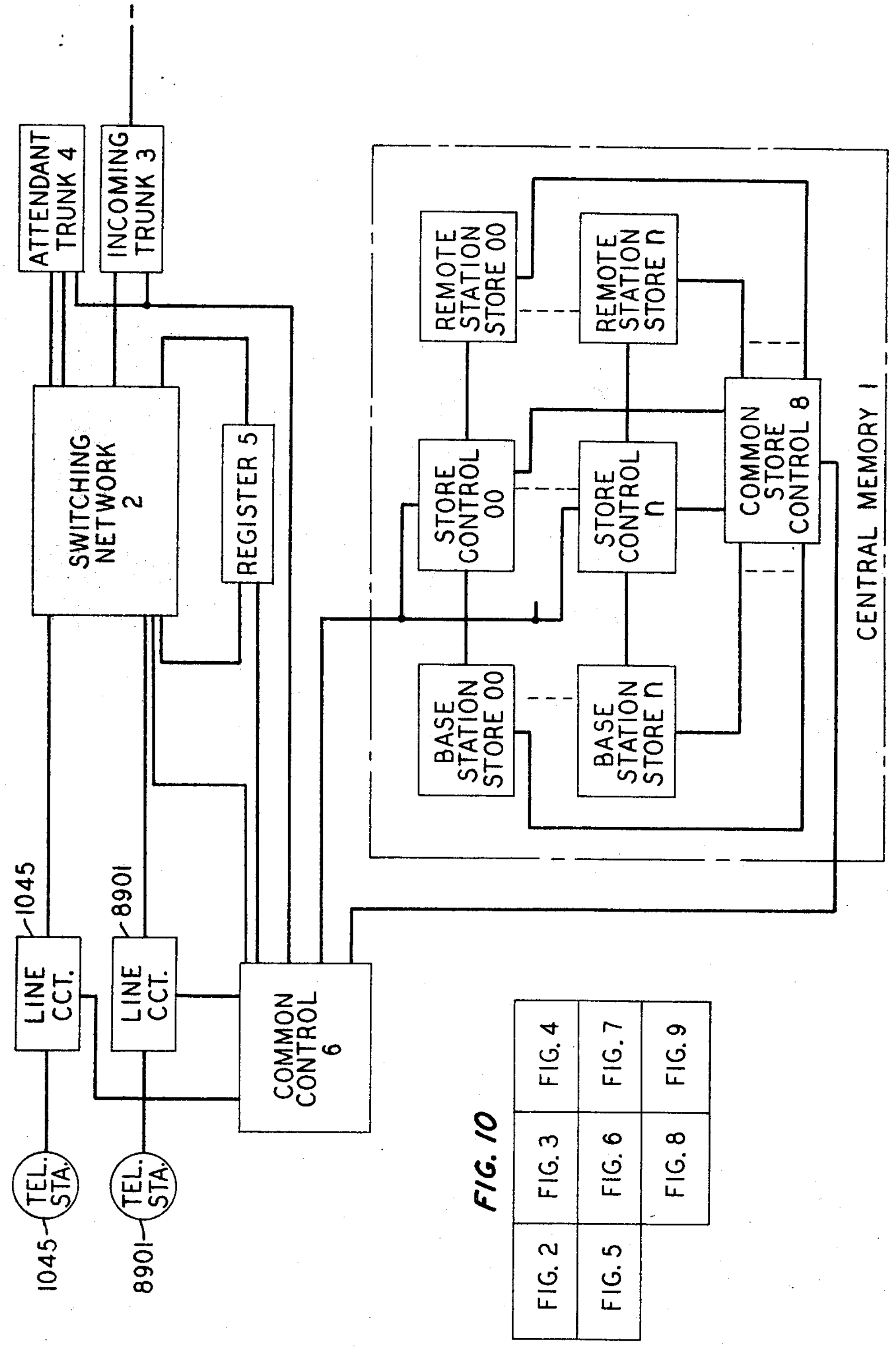
FIG. 1 illustrates a call forwarding system embodying the central memory arrangement of the instant invention.

The detailed logic of the call forwarding central memory shown in FIGS. 2 through 9 is performed by combinations of logic gates, delays, inverters, monopulsers, and flip-flops, the operation and schematic representation of which are well known in the art and are described by J. Millman and H. Taub in the textbook Pulse, Digital, and Switching Waveforms, 1965, McGraw-Hill, Inc. The instant embodiment of the invention utilizes NAND gates in the well-known manner to perform both AND and OR logic functions. In order to differentiate between these two functions those NAND gates performing AND functions are hereinafter referred to as NAND gates and are symbolically shown by the logic symbol of gate BWMOO set forth in FIG. 2 of the drawing. Those NAND gates performing OR functions are hereinafter referred to as NOR gates and are set forth in the drawing by the logic symbol utilized for gate BMTOO of FIG. 2. Where logic symbols are involved, a circle on an input is an indication that a low signal is required to activate the circuit. The absence of a circle is used to indicate that a high signal is required to activate the circuit. The resulting polarity of a circuit output may be determined in the same manner. For example, a high signal on both inputs of NAND gate BWMOO of FIG. 2 results in a low signal output.

GENERAL DESCRIPTION

Referring now to FIG. 1 of the drawing it is intended that central memory 1 shown thereon be associated with a conventional telephone switching system of the type set forth in U.S. Pat. No. 3,377,432 issued to H. H. Abbott et al. on Apr. 9, 1968. The present invention is not limited to use with a telephone switching system of this type but may also be advantageously utilized with other types of switching systems.

As denoted in the drawing of FIG. 1 a plurality of telephone stations, represented by stations 1045 and 8901, are each connected to a correspondingly numbered line circuit. Each line circuit is connected to common control 6 and to the left side of switching network 2. Attendant trunk 4, used to permit an attendant access to and from the switching system, and incoming trunk 3, used to establish connections between other switching systems and telephone stations of the switching system of FIG. 1, are connected to the right side of switching network 2. Register 5 is connected to both the left and right sides of switching network 2 and functions to count and store successively received station number digits and to read out the stored digits to common control 6. Throughout the remainder of this description, the left side of switching network 2 is referred to as the "line side" while the right side is referred to as the "trunk side."

Central memory 1 comprises a number of base station stores, OO through N, and associated remote station stores, OO through N, each controlled by an individual store control, OO through N. In the normal mode of operation, hereinafter described in detail, central memory 1 is enabled to serially write a remote station number selected by a base station user into an idle remote station store. Subsequently the base station number is serially written into the associated base station store. On incoming calls common control 6 enables central memory 1 to simultaneously and sequentially compare each digital pulse train of the called station number with each digital pulse train of the numbers recorded in the base station stores. On a match condition the remote station number is serially read from the remote station store associated with the "matched" base station store. Common control 6 regulates and coordinates the operation of every circuit of the switching system during the serving of calls, and, accordingly, is connected to line circuits 1045 and 8901, switching network 2, register 5, central memory 1, and various trunk circuits.

In the instant embodiment of the invention it is to be assumed that a station user presently located at base station 1045 desires to have all subsequent incoming calls for station 1045 directed to remote station 8901. The base station user initiates a request for service in the conventional and well-known manner by removing the handset of base station 1045. As described in detail by the aforesaid patent of H. H. Abbott et al. an off-hook telephone station, such as station 1045, is connected through the corresponding line circuit 1045 from the line side of switching network 2 to the trunk side appearance of an idle register 5, which in turn, supplies dial tone to the off-hook station. Upon receipt of dial tone the base station user proceeds in the manner set forth in the aforementioned Stevens patent to dial a call forwarding establish code into register 5. Register 5 returns a second dial tone thereby notifying the base station user that directory number 8901 of the remote station may now be dialed and stored in register 5.

When the call forwarding establish code and the remote station number have been dialed into register 5, common control 6 reads the number digit information from register 5 and initiates a call forwarding write sequence by directing common store control 8 of central memory 1 to enable store controls OO through *n*. Common control 6 then proceeds to scan all store controls and upon locating an idle station store serially reads pulses representing each digit of remote station number 8901 over digital leads into the idle remote station store. The selected remote station store counts each received pulse by advancing from initial counting states to counting states corresponding to the dialed digits of the remote station number. Subsequently, common control 6 identifies the calling base station and serially reads pulses representing the base station number 1045 over single digital leads into the base station store associated with the selected remote station store. At this time the base station user at base station 1045 returns the telephone station to an on-hook condition.

An incoming call, directed to base station 1045, is connected by common control 6 through incoming trunk 3 and switching network 2 to the line side appearance of register 5 in order that the called number digits 1045 may be recorded in register 5. When the called number digits 1045 have been recorded in register 5 common control 6 interrogates central memory 1, via common store control 8, by simultaneously connecting a high speed pulse train having a fixed number of pulses to every base station store. All base station stores are cycled through a complete sequence by the application of the pulse train from a stored digit counting state through the initial counting state back to the stored digit counting state. When each base station store advances through the initial counting state the remaining pulses of the high speed pulse train, applied to the individual base station store and corresponding to the sum of the base station pulses previously recorded in each base station store, are serially and simultaneously compared with the digit pulses of the called number digits recorded in register 5. If the called number does not match any of the base station numbers recorded in central memory 1 the called number, already recorded in common control 6, is employed to establish a connection in the conventional and well-known manner from incoming trunk 3 through switching network 2 to called base station 1045. In the event the called number matches stored base station number 1045, the remote station number 8901 is serially read from the associated remote station store into common control 6. The connection is then established from incoming trunk 3 through switching network 2 to remote station 8901.

A base station user may also place a call to the attendant and request the attendant to transfer all incoming calls for base station 1045 to remote station 8901. The attendant, in the well-known manner, places a call to base station 1045 and, when connected to the idle base station, obtains a connection to register 5 and dials the call forwarding establish code in combination with the remote station number 8901 into register 5. As earlier set forth, common control 6 writes the remote station number 8901 into an idle remote station store and the called base station number 1045 into the associated base station store. Subsequently, all calls attempting to complete to base station 1045 are completed to remote station 8901.

DETAILED DESCRIPTION

1. General

In the present embodiment of the invention it is intended that central memory 1 be equipped with 16 store circuits each comprising a base station and a remote station store with an associated store control. It is to be understood that the present invention is not limited for use with a specific number of memory store circuits but that the number 16 was arbitrarily chosen to illustrate the principles of the present invention.

Figure 2:
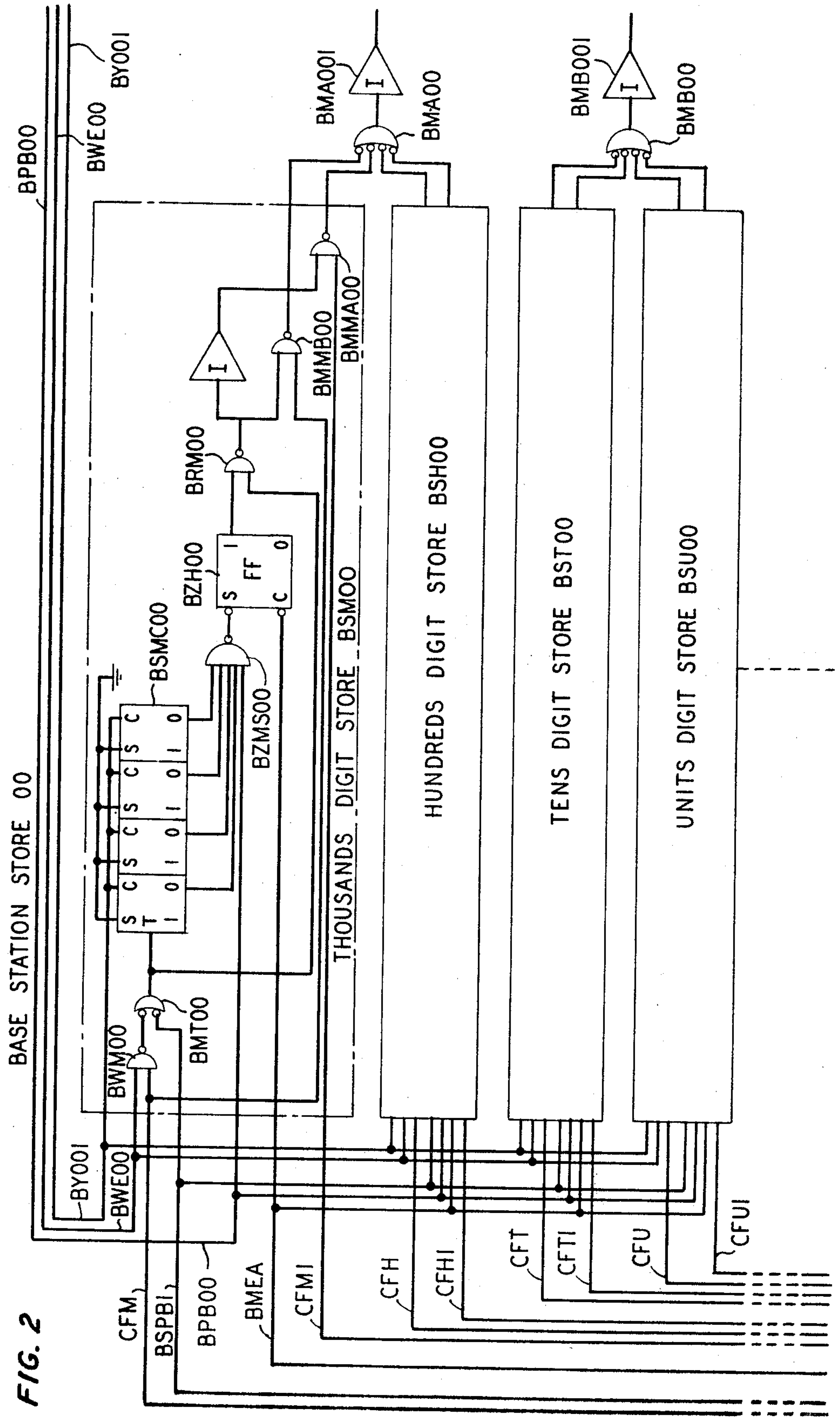
FIGS. 2 through 7, when arranged in accordance with FIG. 10, set forth the central memory circuit details of a plurality of address and store locations, hereinafter referred to as base station and remote station stores controlled by individual store controls.
Figure 4:
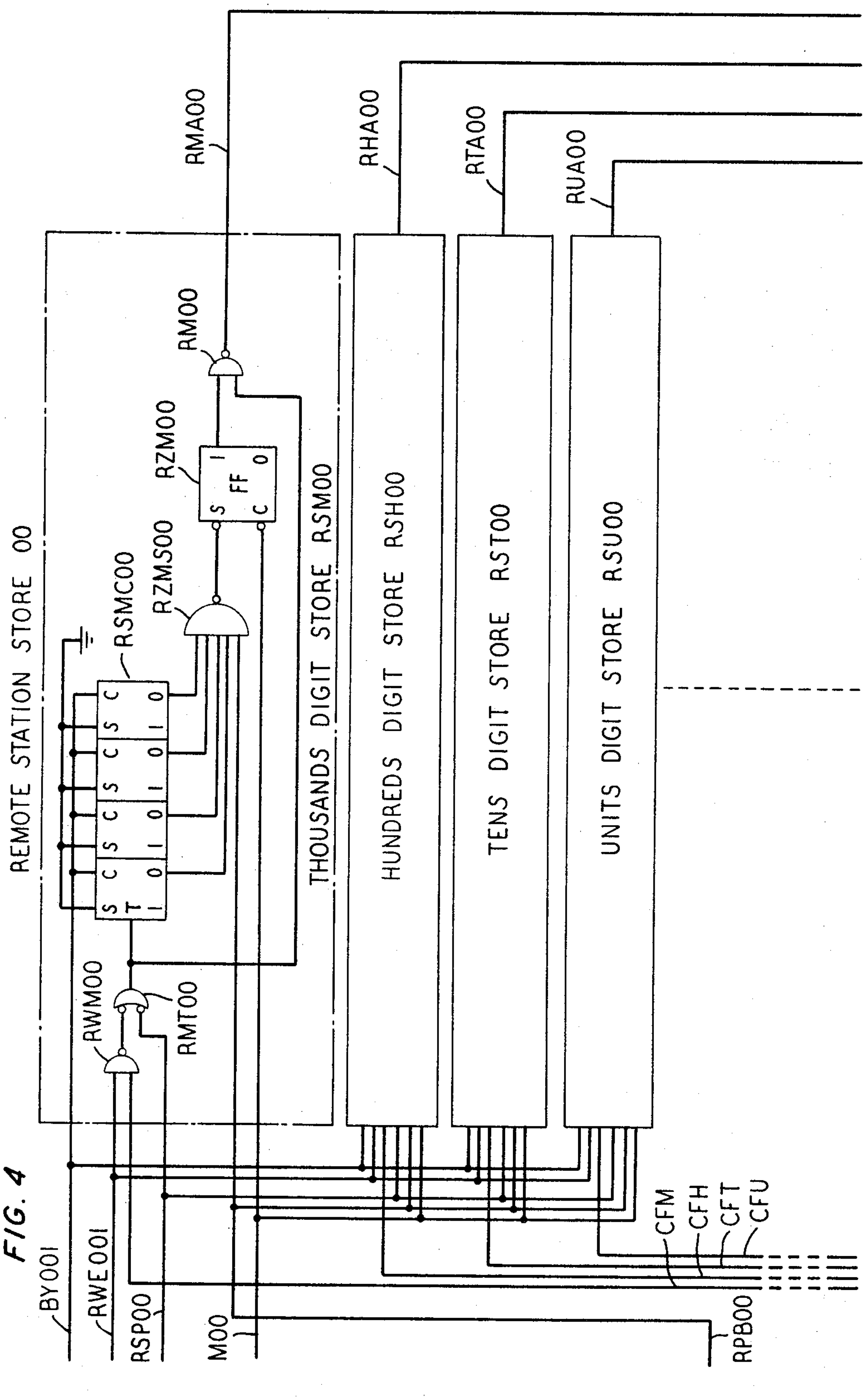
Figure 5:
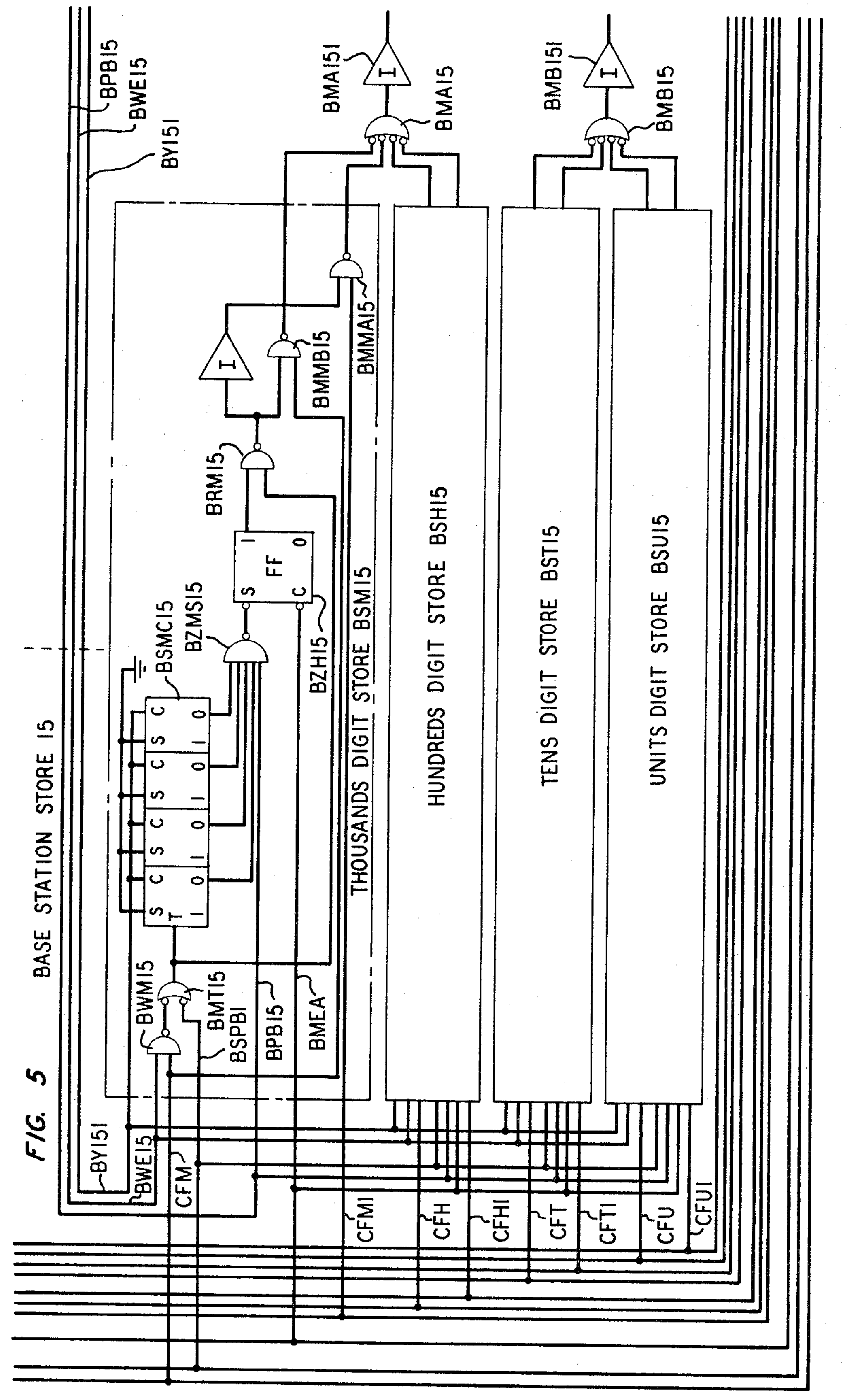

Referring now to FIGS. 2 and 5, each of the base station stores OO through 15 comprise a thousands digit store, a hundreds digit store, a tens digit store, and a units digit store. It is intended that each of the base station digit store circuits such as hundreds digit store BSHOO, tens digit store BSTOO, and units digit store BSUOO be comprised of the logic circuitry shown in detail in thousands digit store BSMOO. It is further intended that the digit stores of each base station store, such as base station store 00, be identical with every other base station store. It is also intended that the hundreds digit, tens digit, and units digit stores of each remote station stores OO through 15, shown in FIGS. 4 and 7, be made up of the identical logic circuitry shown for thousand digit stores RSMOO and RSM15. Similarly, the logic circuitry of each store control is identical to the circuitry of store controls 00 and 15 set forth in FIGS. 3 and 6.

Each digit store circuit of every base station and every remote station store has included therein a ripple counter comprised of a cascade of 4 binary flip-flop elements arranged to count and store binary pulses in one of 16 possible counting states. The flip-flop elements of each digit store circuit, BSMCOO, BSMC15, RSMCOO, and RSMC15, set forth in FIGS. 2, 5, 4, and 7, respectively, are connected so that an output from a preceding flip-flop will trigger a succeeding flip-flop to the reverse state during every other trigger input to the preceding flip-flop element.

In the initial state it is assumed that every counter flip-flop element is set to the "0" state therefore creating an initial digit store counter state 0000. The first pulse applied to the trigger input of a digit store counter set in the initial counter state resets the first flip-flop element to the "1" state to provide a subsequent digit store counter state 1000. The second externally applied pulse to a digit store counter sets the first flip-flop element to the "0" state, which in turn, triggers the second flip-flop element to the "1" state to create a counter state of 0100. Subsequent pulses continue to change the output of the first flip-flop element on every positive going transition occurring at the trigger input. In addition, the outputs of the second flip-flop element change on every other positive transition at the trigger input, the outputs of the third flip-flop element change on every fourth positive transition, and the outputs of the fourth flip-flop element on every eighth positive transition.

On the 15th pulse every digit store counter flip-flop element is set to the "1" state thereby establishing a counter state 1111. The next input pulse, the sixteenth input pulse, resets all of the digit store counter's flip-flop elements to the "0" state to advance the counter to the initial counter state of 0000. Thus, each digit store counter counts pulses appearing at input T and stores the sum thereof in a binary code format in one of the 16 counting states corresponding to the number of pulses received. Similarly, the application of a number of pulses equal to the fixed number of counting states advances a digit store counter from the initial counting state through all counting states back to the initial counting state. If the digit store counter is initially set to a stored digit counting state, the fixed number of pulses cycles the counter through all counting states back to the initial stored digit counting state.

2. Remote Station Write

Figure 3:
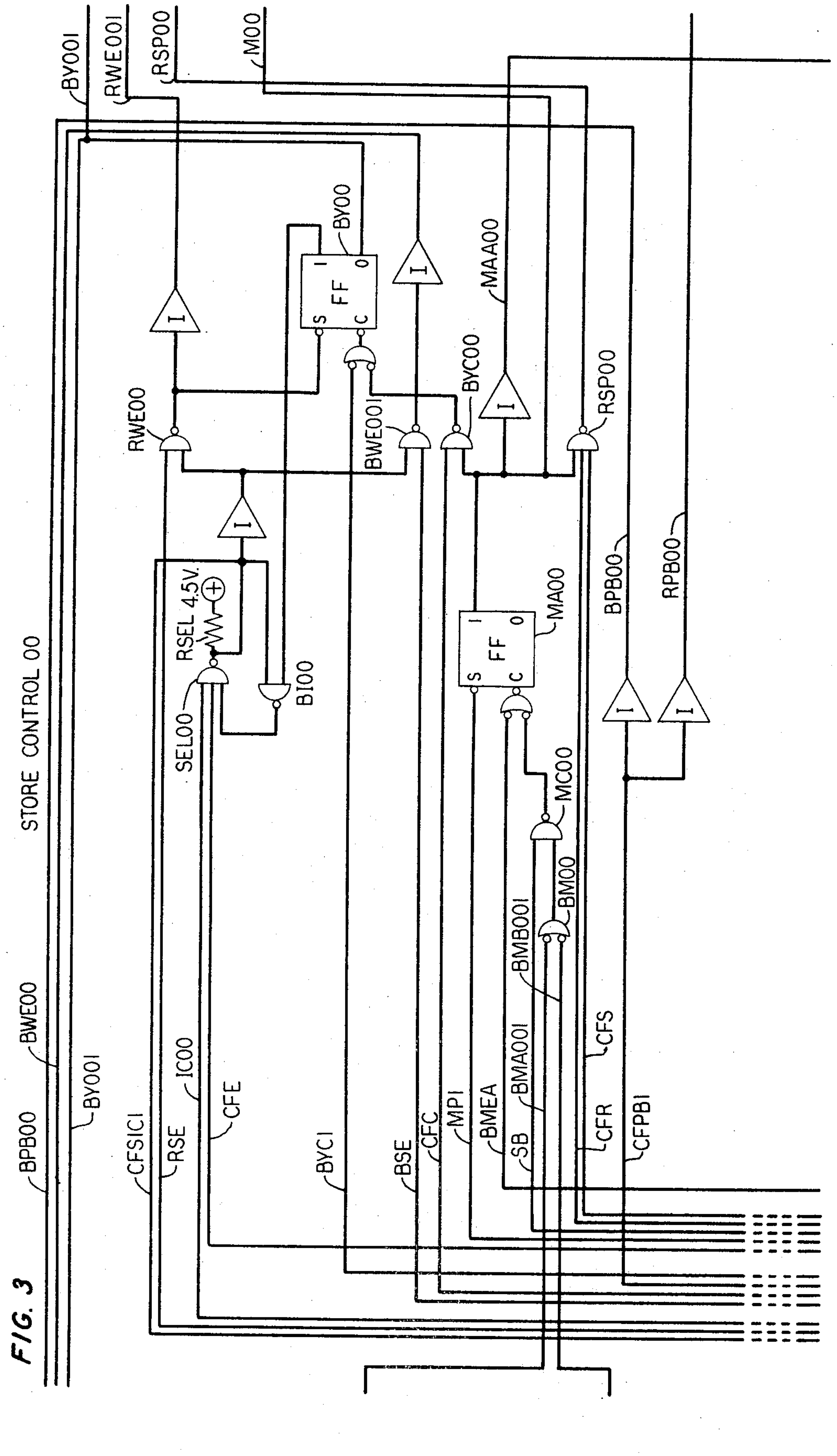
Figure 6:
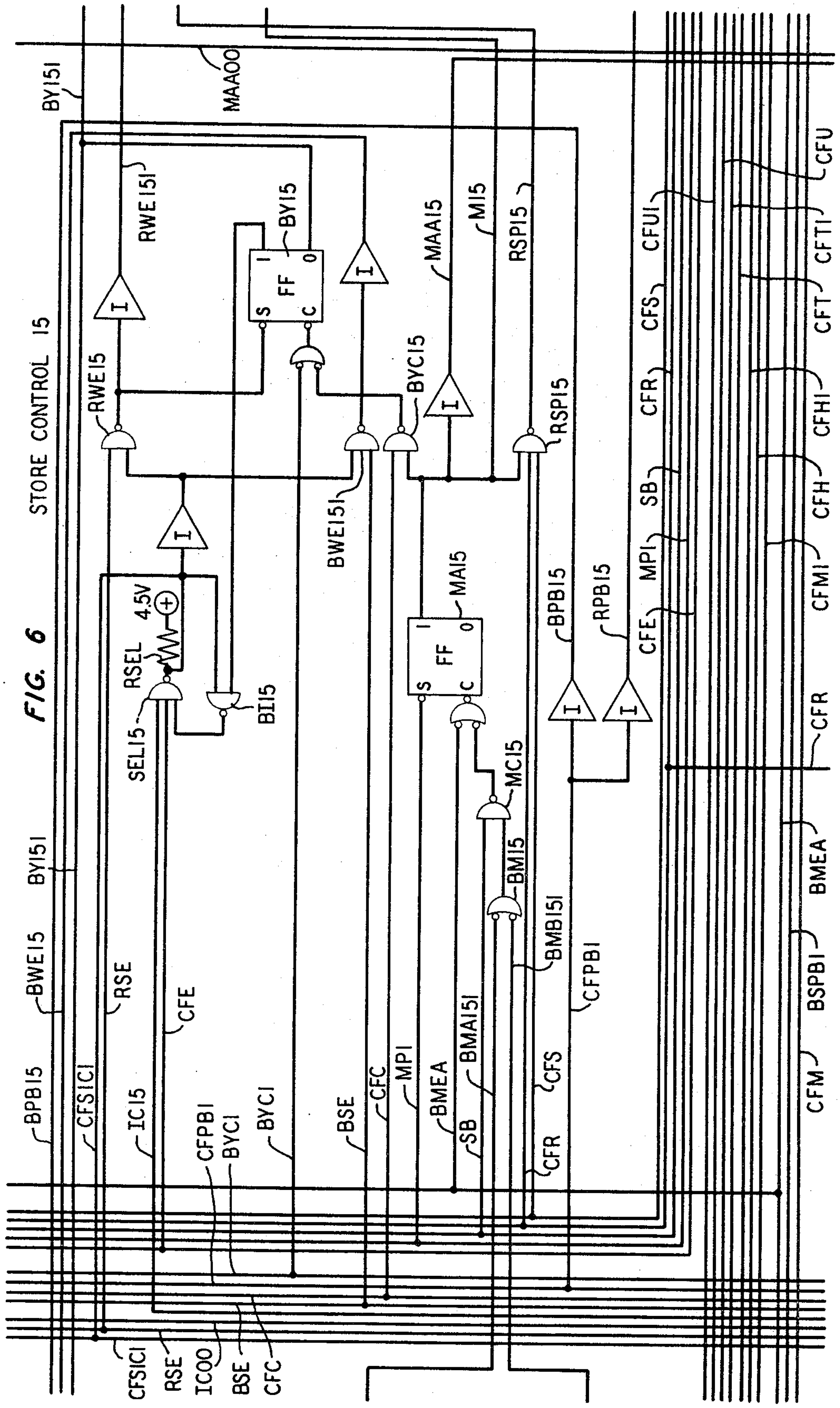
Figure 7:
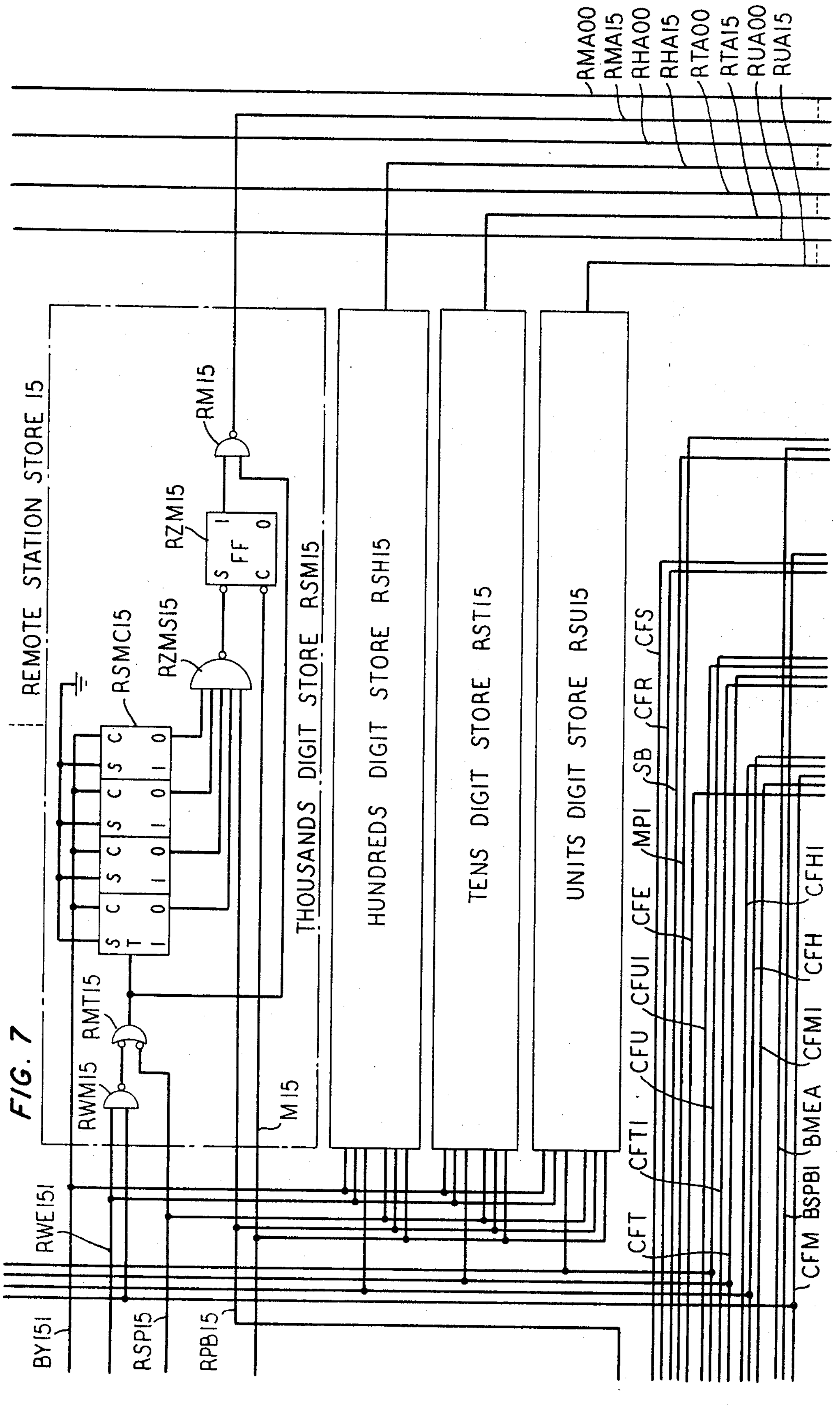

Initially, it is assumed that every store control circuit, FIGS. 3 and 6, of central memory 1 is idle and that the BY- flip-flops of store controls 00 through 15 are in the cleared state. When flip-flop BY00 is cleared a high signal is placed on lead BY001 extending to base station store 00 and remote station store 00, FIGS. 2 and 4. Referring now to FIG. 2, the high signal appearing on lead BY001 is applied to thousands digit store BSMOO, hundreds digit store BSHOO, tens digit store BSTOO, and units digit store BSUOO to clear the digit store counters such as counter BSMCOO, to the inital counting state 0000. In addition, the high signal on lead BYOO1 to remote station store 00, FIG. 4, clears counter RSMCOO of thousands digit store RSMOO and the counters of hundreds digit store RSHOO, tens digit store RSTOO, and units digit store RSUOO to the initial counting state 0000. Similarly, the cleared flip-flop BY15 of store control 15, FIG. 6, applies a high signal to lead BY151 to clear the counters of the digit stores of base station store 15, FIG. 5, and remote station store 15, FIG. 7. The cleared BY- flip-flops, FIGS.

3 and 6, place a low signal to an input of NAND gates BI- to inhibit the operation of these gates and partially enable NAND gates SEL- for subsequent selection by common control 6.

A station user, located at telephone station 1045, FIG. 1, and desiring to have incoming calls for telephone station 1045 transferred to telephone station 8901, initiates a calling sequence by operating the switchhook of telephone station 1045. As set forth in detail in the aforementioned patent by H. H. Abbott et al. common control 6 detects the off-hook state of telephone station 1045 and selects an idle register such as register 5. The calling line circuit 1045 is connected through switching network 2 to register 5 and dial tone is returned in the well-known manner to the calling station user. At this point it is assumed that the calling station user has knowledge of a special call forwarding establish code which signifies to common control 6 that the dialed number digits that follow are to be written into central memory 1 and stored for future use as a transfer number. When common control 6 has determined that the call forwarding establish code has been dialed by the calling station user into register 5, the register is cleared and a second dial tone is returned to the calling station. Upon receipt of the second dial tone the calling party proceeds to dial the remote telephone station number 8901 into register 5, which in turn, reads out the dialed number into common control 6.

Figure 8:
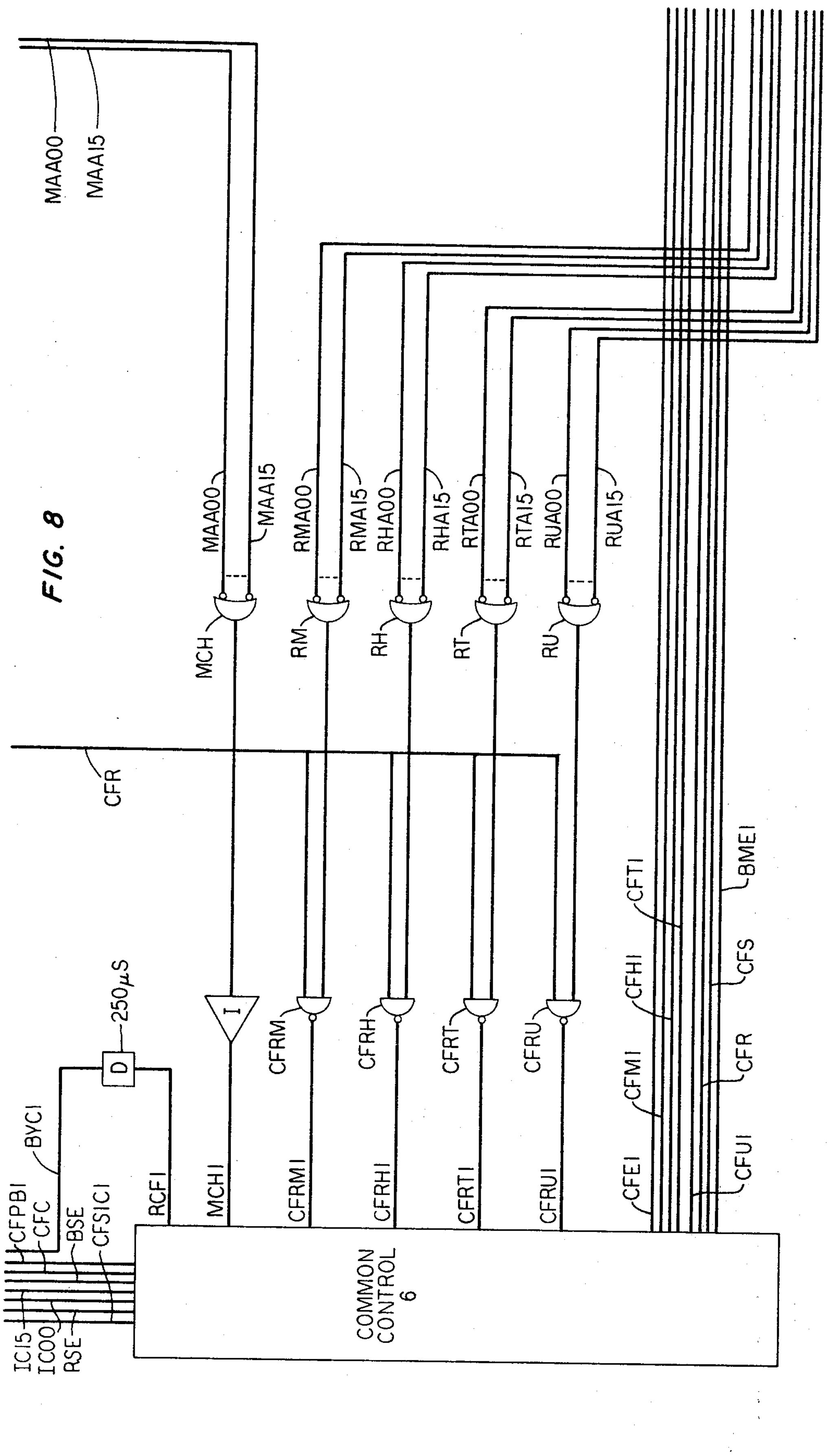
FIGS. 8 and 9 illustrate the circuit details of the central memory common store control.
Figure 9:
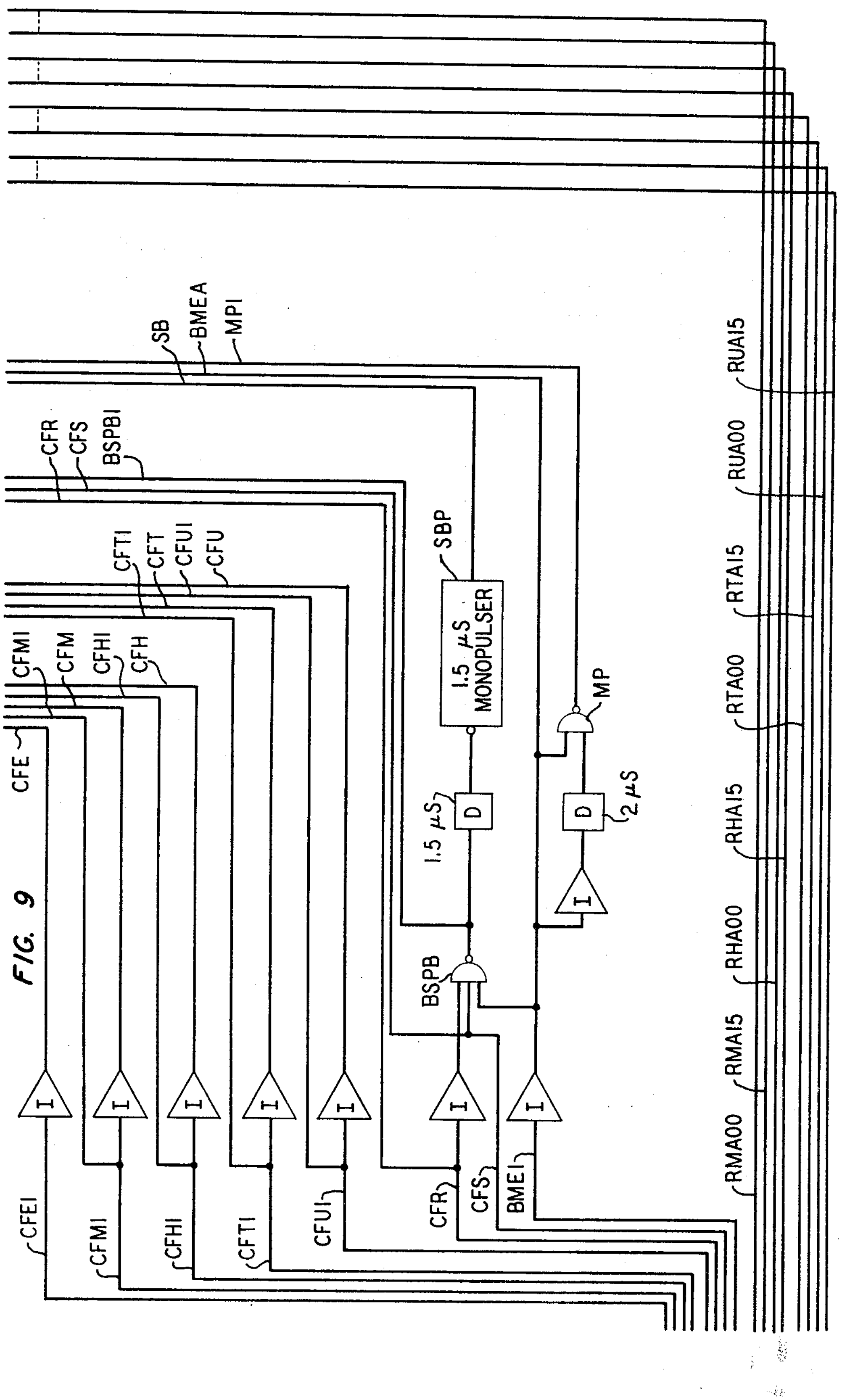

Common control 6 initiates the selection of an idle call forwarding store circuit by placing a low signal on lead CFE1, FIGS. 8 and 9, to common store control 8 of central memory 1. The low signal on lead CFE1 is inverted into a high signal on lead CFE and applied to an input of NAND gates SEL-, FIGS. 3 and 6, of store controls 00 through 15. Common control 6 also starts the idle circuit scanner, described in detail in the aforestated patent by Abbott et al., to sequentially place a high signal on leads ICOO through IC15 to an input of NAND gates SELOO through SEL15 each in turn. Assuming that all base station and remote station stores are idle, the placing of a high signal on lead ICOO enables NAND gate SELOO to place a low signal on lead CFS1C1 to stop the common control idle circuit scanner and to inhibit NAND gate BIOO. In the absence of any idle base station and remote station stores common control 6 completes the scanning sequence, removes the low signal on lead CFE1, and returns a busy tone to the calling party.

The writing of the remote station number 8901 into the selected remote station store 00 is initiated by common control 6 placing a high signal on lead RSE to an input of NAND gate RWEOO. This high signal, in combination with the inverted low signal output of enabled NAND gate SELOO enables NAND gate RWEOO to set flip-flop BYOO to remove the high clearing signal from lead BYOO1 extending to the digit store counter circuits of base station and remote station stores 00. The low output of enabled NAND gate RWEOO is inverted into a high signal on lead RWEOO1, FIG. 4, extending to thousands digit store RSMOO, hundreds digit store RSHOO, tens digit store RSTOO, and units digit store RSUOO. A high signal on lead RWEOO- prepares NAND gate RWMOO of thousands digit store RSMOO for subsequent operation during the receipt of pulses representing the thousands digit of the dialed remote station number. In a likewise manner, similar gates of hundreds digit store RSHOO, tens digit store RSTOO, and units digit store RSUOO are partially prepared for subsequent operation by the hundreds, tens, and units digit pulses of the remote station number.

Common control 6, FIG. 8, writes the dialed remote station number 8901 into remote station store 00 by placing low signal digital pulse trains on the thousands, hundreds, tens, and units lead CFM1, CFH1, CFT1, and CFU1, respectively. The eight serial pulses, corresponding to the thousands digit "8" of the dialed remote station number 8901, appearing on lead CFM1 are inverted, FIG. 9, and applied, via lead CFM, to thousands digit stores RSMOO through RSM15. Since store control 00 has previously placed a high signal on lead RWEOO1, FIG. 4, NAND gate RWMOO is enabled by the eight positive pulses appearing on lead CFM to pulse NOR gate RMTOO and advance counter counting from the initial counting state 0000 through eight eounting states to the stored digit counting state 0001. Similarly, the counters of hundreds digit store RSHOO, tens digit store RSTOO, and units digit store RSUOO are advanced by the hundreds digit "9", the tens digit "0", and the units digit "1" serial pulses appearing on lead CFH, CFT, and CFU, respectively, to the individual stored digit counting states 1001, 0101, and 1000.

After the dialed remote station number 8901 has been written into the digit stores of remote station store 00 common control 6 places a low signal on lead RSE, FIG. 3, to inhibit NAND gate RWEOO of store control 00. The inhibiting of NAND gate RWEOO removes the low signal from the set input of flip-flop BYOO and places a low signal, via an inverter, on lead RWE001, FIG. 4, extending to the digit stores or remote station store 00. The low signal appearing on lead RWEOO1 inhibits NAND gate RWMOO of thousands digit store RSMOO and corresponding gates of digit stores RSHOO, RSTOO, and RSUOO in order that future pulses appearing on leads CFM, CFH, CFT, and CFU do not advance the digit store counters of remote station store 00.

3. Base Station Write

After the dialed remote station number 8901 has been written into an idle remote station store, common control 6, in the manner set forth in the aforementioned patent by H. H. Abbott et al., records the identity of the calling base station 1045. Following the recording of base station number 1045, common control 6, FIG. 8, places a high signal on lead BSE to each of the store controls 00 through 15. This high signal, in combination with the inverted low output of the presently operated NAND gate SELOO, FIG. 3, enables NAND gate BWE001 to place an inverted high signal on lead BWEOO extending to base station store 00, FIG. 2. This high signal partially perpares NAND gate BWMOO of thousands digit store BSMOO and similar gates of hundreds digit store BSHOO, tens digit store BSTOO, and units digit store BSUOO for subsequent operation.

Common control 6, FIG. 8, proceeds to write the base station number 1045 into base station store 00 by simultaneously placing low signal serial pulse trains, corresponding to digits of the base station number, on leads CFM1, CFH1, CFT1, and CFU1. The signal thousands digit pulse appearing on lead CFM1 is inverted, FIG. 9, and applied over lead CFM to NAND gate BWMOO, FIG. 2, to advance counter BSMCOO of thousands digit store BSMOO one counting state to stored digit counting state 1000. Similarly, the ten serial pulses on lead CFH, the four serial pulses on lead CFT, and the five serial pulses on lead CFU advance the counters of digit stores BSHOO, BSTOO, and BSUOO to the stored digit counting states 0101, 0010, and 1010, respectively.

At this point the dialed digits of remote station number 8901 have been recorded in the digit stores of remote station store 00 and the identified digits of the calling base station 1045 have been recorded in the digit stores of base station store 00. After the base station telephone number has been stored in central memory 1, common control 6 removes the low signal from lead CFE1, FIG. 8. The resulting inverted low signal appearing on lead CFE, FIGS. 3 and 9 inhibits NAND gate SELOO of store control 00 thereby placing a high signal on lead CFS1C1 extending to common control 6. The high output signal of the inhibited NAND gate SELOO performs several functions at this time. First, NAND gate BWEOO1 is inhibited in order that a low signal, via an inverter, may be applied over lead BWEOO, FIG. 2, to inhibit NAND gate BWMOO and corresponding write gates of the digit stores of base station store 00. Second, the high output on lead CFS1C1, FIG. 3, in combination with the high signal appearing on the "1" output of the BYOO flip-flop, enables NAND gate BIOO to place a low signal on an input of NAND gate SELOO to inhibit the selection of this gate while telephone station numbers are stored in base and remote station stores 00. Finally, common control 6, detecting the high signal on lead CFS1C1, returns a tone signal in the well-known manner to base station 1045 to inform the calling station user that the call forwarding feature has been activated.

4. Memory Interrogation

Referring now to FIG. 1 it is assumed that incoming trunk 3 is activated by an incoming call directed to base station 1045. As set forth in detail by the Abbott et al. patent, common control 6 initiates a sequence to connect incoming trunk 3 through switching network 2 to a line side appearance of register 5. In the well-known manner, the called station number digits 1045 are recorded and stored in register 5. Before a call can be completed to any station the called number digits, serially read out of register 5, must be compared to all of the base station numbers recorded in the base station stores of central memory 1. If the called station number recorded in register 5 matches a recorded base station number, then common control 6 reads the corresponding remote station number from central memory 1 and completes the call to the identified remote station. In the event the called station number does not match a recorded base station number, common control 6 establishes a connection from incoming trunk 3 to the called station.

Common control 6, noting the presence of a called station number in register 5, institutes the base station store match sequence by placing a low signal on lead BME1, FIGS. 8 and 9, the central memory 1. This low signal is inverted into a high signal on lead BMEA to remove the locking signal that was holding the store control MA-flip-flops in the cleared state and to partially enable NAND gates BSPB and MP. The initial low locking signal present on lead BMEA is inverted and applied as a high signal to the remaining input of NAND gate MP. Thus, when common control 6 institutes the base station store match sequence, the resulting high signal on lead BMEA enables NAND gate MP to place a low signal on lead MP1. After 2 microseconds the high signal is removed from the remaining input to inhibit operation of NAND gate MP and place a high signal on lead MP1. The resulting low pulse signal, having a time duration of 2 micro-seconds and appearing on lead MP1, sets the MA-flip-flops, FIGS. 3 and 6, of all store control 00 through 15. With the MA-flip-flops set to the "1" state the high signal appearing on each "1" output terminal is inverted and applied over leada MAA- to the leads corresponding inputs of NOR gate MCH, FIG. 8. The resulting high output of NOR gate MCH is inverted and transmitted to common control 6 over lead MCH1.

Upon receipt of the low signal on lead MCH1, common control 6 transmits a train of 16 high speed shift pulses to central memory 1 on lead CFS. In the present embodiment it is assumed that each pulse is a high signal pulse having a time duration T of approximately 5 microseconds and that each high pulse occurs at a time interval 4T. In between each high pulse signal there is a time interval of 3T wherein a low signal appears on lead CFS. Every high pulse appearing on lead CFS enables NAND gate BSPB, FIG. 9, to place a corresponding low signal pulse on lead BSPB1 to each thousands, hundreds, tens, and units digit store of base station stores 00 through 15. In addition, every 5 microsecond pulse output of NAND gate BSPB is delayed 1.5 microseconds and applied to the input of monopulser SBP in order that a high strobe pulse signal, having a time interval of 1.5 microseconds, may be placed on lead SB. The strobe pulse signal occurring near the center of each shift pulse appearing on lead BSPB1 is applied, via lead SB, to a input of NAND gate MC- of each store control. Simultaneously, with the placing of 16 high speed shift pulses on lead CFS, common control 6 transmits a delayed train of 16 low pulse signals on lead CFPB1, FIGS. 3 and 6, such that each delayed pulse occurs at an interval of T after the end of each shift pulse. The delayed pulses are inverted in each store control and applied over lead BPB- to an input of each digit store NAND gate BZMS- of base station stores 00 through 15.

Referring now to FIGS. 2 and 5, the pulse train of 16 low pulse signals on lead BSPB1 enables NOR gates BMT- of thousands digit stores BSMOO through BSM15 to pulse their respective counters through 16 counting states. Since counter BSMCOO was initially set to counting state 1000, representing the thousands digit 1 of the previously stored base station number 1045, the first 15 pulses advances the counter from the stored digit counting state 1000 through 15 counting states to the initial counting state 0000. When counter BSMCOO is set to the initial counting state 0000, high signals occurring on the "0" terminals of each counter flip-flop partially prepare NAND gate BZMSOO for subsequent operation. The delayed high signal pulse, occurring on lead BPBOO at a time interval T after the 15th shift pulse, enables NAND gate BZMSOO to set flip-flop BZHOO to the "1" state and partially enable NAND gate BRMOO. The 16th high speed shift pulse appearing on lead BSPB1 enables the remaining input to NAND gate BRMOO and enables NOR gate BMTOO to advance counter BSMCOO to the stored digit counting state 1000. Nand gate BRMOO operates to place a low signal pulse to an input of NAND gate BMMBOO and, via an inverter, a high signal pulse to an input of NAND gate BMMAOO. Thus, the effect of applying the high speed 16 pulse train to thousands digit store BSMOO has been to obtain one pulse, corresponding to the thousands digit "1" previously recorded in counter BSMCOO, of the 16 pulse train from the output of NAND gate BRMOO. This pulse is then applied to comparison logic circuitry comprising an inverter and NAND gates BMMAOO and BMMBOO. Similarly, the high speed shift pulses appearing on lead BSPB1 advance the counters of hundreds digit store BSHOO, tens digit store BSTOO, and units digit store BSUOO from their initial counting states of 0101, 0010, and 1010, respectively, to generate serial pulse trains of 10, 4, and 5 pulses which, in turn, are applied to the comparison logic circuitry individual to each digit store.

In the present embodiment of the invention it is assumed that register 5 receives, stores, and counts station dialed digital pulse trains in cyclic counters and read circuitry similar to the instant base and remote station store circuits. Registers of this type are disclosed in a copending application, entitled *Digital Register Readout Circuit*, Ser. No. 163,213, filed July 16, 1971 by Messrs. E. J. Braun, H. A. Meise, Jr. and G. W. Taylor, (Case 4-5-2). However, it is not necessary to read this copending application to fully understand the present invention. Thus, the high speed 16 pulse train, applied simultaneously by common 6 to central memory 1 and to register 5, results in serial digital pulse trains, representing the thousands, hundreds, tens, and units digits of the called station number 1045 recorded in register 5, being read into common control 6 and over thousands lead CFM1, hundreds lead CFH1, tens lead CFT1, and units lead CFU1 to central memory 1. Prior to the first low pulse signal appearing on thousands digit lead CFM1, FIG. 2, NAND gate BRMOO is held in the inhibit state by the low output from the BZHOO flip-flop. The resulting high output of NAND gate BRMOO is inverted and applied as a low signal to an input of NAND gate BMMAOO to maintain a high output signal from this gate. In the idle state the high signal present on lead CFM1 is inverted, FIG. 9, into a low signal and applied over lead CFM to inhibit each digit store NAND gate BMMB-. The inhibited NAND gates BMMB- and BMMA- of each digit store maintain a high signal on the corresponding inputs of NOR gates BMA- and BMB-.

The tranmissions of the single pulse, representing the thousands digit "1" of the called base station number 1045, from common control 6 occurs as a low pulse signal on lead CFM1 and a high pulse signal on lead CFM. Simultaneously, NAND gate BRM00, enabled by the set flip-flop BZHOO and the last pulse of the 16 pulse train appearing on the input of counter BSMCOO, places a low signal on the corresponding input of NAND gate BMMBOO and a high signal, via an inverter, on an input of NAND gate BMMAOO. Thus, both NAND gates BMMAOO and BMMBOO are inhibited and their respective outputs continue to remain high. After the single thousands digit pulse has been received by central memory 1 NAND gate BRMOO is again inhibited and lead CFM returned to a low signal state in order that NAND gates BMMAOO and BMMBOO may continue to be held in the inhibited state.

Similarly, the 10 serial pulses appearing on leads CFH1 and CFH are simultaneously compared with the remaining high speed shift pulses gated from the counter of hundreds digit store BSHOO. In the match condition the comparison logic of hundreds digit store BSHOO remain inhibited thereby placing high signals on the remaining inputs to NOR gate BMAOO. When the remaining tens and units digits of the called station number, appearing as 4 and 5 serial pulse signals on leads CFT1, CFT, CFU1, and CFU, match the 4 and 5 serial pulses read individually from the counters of tens and units digit stores BSTOO and BSUOO, high signals are placed on the corresponding inputs of NOR gate BMBOO. Thus, the matching of the called station number 1045 recorded in register 5 with the base station number 1045 previously recorded in base station store 00 inhibit operation of NOR gates BMAOO and BMBOO to place inverted high signals on leads BMA001 and BMB001 extending to store control 00 of FIG. 3. The high signals on these two leads inhibit NOR gate BM00. The resulting low signal output inhibits NAND gate MC00 to prevent the subsequent high strobe pulse signal appearing on lead SB from clearing the MA00 flip-flop. Thus, flip-flop MA00 remains in the previously set position and continues to place an inverted low signal on lead MAA00 extending to common store control 8.

In the idle state the counters of the digit stores of base station store 15 are set to the initial counting state 0000. Thus, the 16 high speed shift pulses appearing on lead BSPB1 advance each digit store counter from the initial counting state 0000 through 16 counting states to counting state 0000. The delayed clock pulse appearing on lead BPB15 after the 16 shift pulse, enables the thousands digit store NAND gate BZMS15 to set the BZH15 flip-flop to the "1" state and place a high signal on an input of NAND gate BRM15. Prior to and during the time interval the 16 shift pulses appear on lead BSPB1, the BZM15 flip-flop remains in the "0" state to inhibit NAND gate BRM15. The inhibiting of NAND gate BRM15 results in the partial enabling of NAND gate BMMB15 and the inhibiting of NAND gate BMMA15. Since digital leads CFM, CFH, CFT, and CFU are normally held low, except for the interval of time a pulse of the called station number is placed on the leads by common control 6, NAND gate BMMB15 is also inhibited. The resulting high output of inhibited NAND gates BMMB15 and BMMA15, in combination with similarly inhibited gates of hundreds digit store BSH15, tens digit store BST15, and units digit store BSU15, inhibit NOR gates BMA15 and BMB15.

The The call high pulse of the called station number thousands digit "1," appearing on lead CFM simultaneously with the last pulse of the 16 shift pulses on lead BSPB1, enables NAND gate BMMB15 to place a low signal on a corresponding input of NOR gate BMA15. Similarly the 10 serial pulses, representing the hundreds digit "0" of the called station number 1045, appearing on lead CFH simultaneously with the last 10 pulses of the 16 high speed shift pulse train on lead BSPB1 enable NAND gate BMHB15, not shown, of hundreds digit store BSH15 to place a low signal on a corresponding input of NOR gate BMA15. Likewise, the 4 and 5 serial pulses appearing on leads CFT and CFU, respectively, enable comparison NAND gates, similar to NAND gate BMMB15, of digit stores BST 15 and BSU15 to place low signals on corresponding inputs of NOR gate BMB15. Thus, NOR gates BMA15 and BMB15 are enabled when the outputs of the digit store counters, which were initially set to counting state 0000 do not match the serial trains of called station digital pulses appearing on leads CFM, CFH, CFT, and CFU.

In order to describe the interrogation sequence for a base station store haing a stored base station number different from that of the called base station number, assume that station number 2035 has previously been read into the digit stores of base station store 15. The application of the 16 high speed shift pulses on lead BSPB1 advance the digit store counters from their respective stored digit counting states through 16 counting states to gate 2 of the shift pulses through AND gate BRM15 and 10, 3, and 5 of the serial shift pulses through corresponding NAND gates of digit stores BSH15, BST15, and BSU15, respectively. Prior to the counter pulse signals appearing at the output of NAND gate BRM15, NAND gates BMMA15 and BMMB15 are inhibited by the inverted output signal of inhibited NAND gate BRM15 and by the low signal apearing on lead CFM. During the interrogation of central memory 1 by common control 6 the 15th pulse of the 16 pulse train appears as the first low signal pulse at the output of NAND gate BRM15. Since a high signal appears on lead CFM1 until the signal low pulse corresponding to the thousands digit "1" of the called station number 1045 occurs during the time interval of the 16th shift pulse, the first pulse signal output of NAND gate BRM15 is inverted to enable NAND gate BMMA15. The enabled NAND gate BMMA15 places a low signal on the corresponding input of NOR gate BMA15 as an indication that the thousands digit "2" stored in digit store BSM15 does not match the thousands digit "1" of the called station number 1045.

Since the hundreds digit "0" of the stored base station number 2035 matches the hundreds digit "0" of the called base station 1045 the comparison logic of hundreds digit store BSH15 remain inhibited to place a high signal on the corresponding input of NOR gate BMA15. The comparison logic of tens digit store BST15, identical to that shown in detail for digit store BSM15 and having NAND gates, similar to NAND gates BMMA15 and BMMB15, designated BMTA15 and BMTB15, respectively, is inhibited prior to the appearance of the first pulse of the called station number tens digit 4 on lead CFT. Prior to the occurrence of the first of four high pulses appearing on lead CFT, the cycling counter of tens digit store BST15 maintains a high signal on an input of NAND gate BMTB15 and a low signal on an input of NAND gate BMTA15. The occurrence of the first high pulse signal of the called station number tens digit "4" on lead CFT, simultaneously with the 13th high speed shift pulse and prior to the read out of the first pulse of the stored base station tens digit "3", enables NAND gate BMTB15 to place a low signal on the corresponding lead extending to the input of NOR gate BMB15. This low signal indicates that the tens digit "4" of the called station number 1045 mismatches the tens digit "3" of the base station number 2035 stored in tens digit store BST15. The 5 pulses of the units digit "5" of the called station number appearing on leads CFU and CFU1 match the 5 pulses read from the cycling counter of units digit store BSU15 thereby resulting in a high signal being placed on the lead extending from digit store BSU15 to an input of NOR gate BMB15. Thus, during the interrogation of base station store 15 the comparison logic of hundreds digit store BSH15 and units digit store BSU15 maintain high signals on inputs of NOR gates BMA15 and BMB15, respectively, to indicate that the hundreds and units digits of the stored base station number 2035 match the corresponding hundreds and units digits of the called station number 1045. In addition, the outputs of thousands digit store BSM15 and tens digit store BST15 are made low to indicate a mismatch between the thousands and tens digits of the stored and called station numbers.

Referring now to store controls 00 and 15, shown in FIGS. 3 and 6, it is recalled that the high signals appearing on leads BMA001 and BMB001 from the matched digit stores of base station store 00 inhibited NOR gate BM00 and NAND gate MC00 to prevent the strobe pulses appearing on lead SB from clearing the MA00 flip-flop. The mismatch of the digit stores of base station store 15 enable NOR gates BMA15 and BMB15 to place inverted low pulse signals on leads BMA151 and BMB151 during the time intervals that the called station number digit pulses do not match the stored base station number pulses gated from the digit store counters. A low pulse signal occurring on either, or both, of leads BMA151 and BMB151 operate NOR gate BM15 to partially enable NAND gate MC15 during the pulse interval T. The subsequent occurrence of the high strobe pulse on the SB lead during the center of the pulse interval T enables NAND gate MC15 to clear flip-flop MA15 as an indication that the called station number does not match the station number recorded in base station store 15.

In summary, common control 6 interrogates central memory 1 by simultaneously placing a fixed length serial pulse train and digital pulse trains, corresponding to a called station number, on leads extending to all base station stores. The fixed length serial pulse train cycles the digit store counters from stored digit counting states through a fixed number of counting states to generate serial pulse trains, corresponding to digits of stored station numbers, that are serially compared to the called station digit pulse trains. In the match condition the interrogating digital pulse trains occur in common with the respective digit store counter generated digital pulse trains of a base station store to inhibit comparison logic circuitry to prevent the clearing of a store control flip-flop. Should a pulse of an interrogating digital pulse train occur prior to, or subsequent to, a digit store counter generated pulse train, a mismatch occurs and the digit store comparison logic circuitry is enabled to clear a corresponding store control flip-flop as an indication that the called station number is not stored in a base station store.

5. Remote Station Read

In the event the called station number recorded in register 5 does not match any station numbers recorded in the base station stores of central memory 1, the MA- flip-flops of every store control are cleared to place inverted high signals on leads MAA - to NOR gate MCH of common store control 8, FIG. 8. With high signals appearing on every input NOR gate MCH is inhibited to place an inverted high signal on lead MCH1. Upon recript of this high signal common control 6 is informed that the called station number does not match any of the station numbers recorded in the base station stores of central memory 1. Accordingly, common control 6 places a high signal on lead BME1 and proceeds in the normal and well-known manner to establish a connection from the calling station through switching network 2 to the dialed called station. The high signal on lead BME1 is inverted into a low signal on lead BMEA to inhibit NAND gate BSPB, to clear the counter output flip-flops of all base station stores, and the store controls MA-flip-flops.

When the digits of the called station number match the digits of the base station number recorded in a base station store, the MA-flip-flop of the corresponding store control, FIG. 3 and 6, remains in the set state. Thus the serial matching of the digits of called station number 1045 with the digits of base station number 1045 recorded in base station store 00 enables the previously set flip-flop MA00 to continue to place an inverted low signal on lead MAA00. The low signal appearing on this lead enables N0R gate MCH, FIG. 8, to place an inverted low signal on lead MCH1 to inform common control 6 of the match condition. In addition, the high output of the "1" terminal of set flip-flop MA00 partially enables NAND gate RSP00 and unlocks the RZM00 flip-flop, via lead M00, of thousands digit store RSM00 and the corresponding flip-flops located in digit stores RSH00, RST00, and RSU00 of remote station store 00. The previously cleared flip-flops MA- of store controls 01 through 15, indicating a mismatch of the recorded station numbers recorded in base station stores 01 through 15 with the called station number, place low signals on leads M- to inhibit the respective store control NAND gates RSP- and to lock the digit store counter flip-flops of remote station stores 01 through 15 to the cleared state.

Common control 6 detects the low signal on lead MCH1 and initiates a read out of the remote station number from central memory 1 by placing a high signal on lead CFR, a serial train of 16 high shift pulses on lead CFS, and delayed clock pulses on lead CFPB1. The high signal on lead CFR partially enables NAND gates CFRM, CFRH, CFRT, and CFRU and is inverted into a low signal to inhibit NAND gate BSPB to prevent the recorded information in the digit store counters of the base station stores from being read into their comparison logic circuitry. Referring now to FIGS. 3 and 4, the high pulse signals appearing on lead CFS, in combination with the high output of set flip-flop MA00 and the high signal on lead CFR enables NAND gate RSP00 of store control 00 to repeat the pulses of the high speed pulse train over lead RSP00 to the digit stores of remote station store 00. Since the MA- flip-flops of store controls 01 through 15 have been cleared the high speed pulse train is only applied to remote station store 00.

In the aforementioned manner the high speed 16 pulse train appearing on lead RSP00, FIG. 4, advances the digit store counters of remote station store 00 from the stored digit counting states through an initial counting state back to the stored digit counting states. As each digit store counter advances through the initial counting state logic circuitry, corresponding to flip-flop RZMOO and NAND gates RZMS00 and RM00 of thousands digit store RSM00, is enabled to gate the remaining pulses of the high speed pulse train onto leads extending to common store control 8, FIGS. 8 and 9. These pulses, representing the digits of the remote station number 8901 previously recorded in remote station store 00, appear individually as 8, 9, 10, and 1 pulse trains on leads RMA00, RHAOO, RTAOO, and RUA00. Accordingly, each N0R gate RM, RH, RT, and RU is pulsed to enable the connecting NAND gates CFRM, CFRH, CFRT, and CFRU to transmit the 8, 9, 10, and 1 serial pulse trains over leads CFRM1, CFRH1, CFRT1, and CFRU1, respectively, to common control 6.

Common control 6, upon detecting the serial pulse trains corresponding to the digits of the previously stored remote station number 8901, establishes a connection, in the well-known manner set forth in the aforementioned patent by Abbott et al., from the calling station to remote station 8901. After readout of the remote station number has been completed common control 6 places a high signal on lead BME1. The resulting low signal appearing on lead BMEA clears the previously set flip-flop MA00, FIG. 3, to place a low locking signal on lead M00 extending to the digit store flip-flops of remote station store 00.

6. Call Forwarding Cancel

A base station user may cancel the call forwarding service from base station 1045 by removing the station receiver and dialing a call forwarding cancel code into register 5. When common control 6 detects the cancel code it proceeds in the well-known manner to identify calling base station 1045 and record the digits of the station number therein. Common control 6 then initiates an interrogation of central memory 1 in the previously described manner by serially transmitting the digits of the calling station number 1045 to base station stores 00 through 15. Since the transmitted station digits 1045 simultaneously match the station digits 1045 read from the digit stores of base station store 00, the MA00 flip-flop, FIG. 3, of store control 00 remains in the set state to partially enable NAND gate BYC00 and to signal common control 6 that a match has occurred.

Upon detecting the match condition common control 6 places a high signal on lead CFC to enable NAND gate BYC00 to clear flip-flop BY00. The cleared BY00 flip-flop places a high signal on lead BY001 to clear the thousands, hundreds, tens, and units digit store counters of the base and remote station stores 00 to the initial counting states 0000. In addition, a low signal appearing at the "1" output of cleared flip-flop BY00 inhibits NAND gate BI00 to partially enable NAND gate SEL00 for the future selection of the now idle base and remote station stores 00. Common control 6 releases central memory 1 by placing a high signal on lead BME1 to inhibit NAND gate BSPB, FIG. 9, clear the MA- flip-flops of the store controls, FIG. 3 and 6, and the digit store flip-flops of the base station stores, FIGS. 2 and 5.

7. Attendant Call Forwarding

In the instant embodiment of the present invention the call forwarding feature of a base station, for example, base station 1045, may be activated by an attendant. The attendant initiates the call forwarding sequence by establishing a connection through attendant trunk 4 and switching network 2 to base station 1045. Upon completion of this connection the attendant in the well-known manner, establishes a second connection to register 5 and proceeds to dial the call forwarding establish code into the register. From this point on the sequence of operation is identical to that earlier described in detail and common control 6 is enabled to write the dialed remote station number 8901 and the attendant called base station number 1045 into an idle base and remote station store combination of central memory 1.

The attendant may also cancel the call forwarding service feature for a base station by establishing a connection to register 5 and dialing the call forwarding cancel code and the base station number into the register. The receipt of the cancel code by common control 6, and the subsequent serial matching of the attendant dialed base station number with the stored station number previously recorded in a base station store, enables common control 6 in the aforementioned manner to restore the base and remote station stores containing the base station number to the idle state.

The attendant may also restore all base station and remote station stores of central memory 1 to the idle condition by dialing a call forwarding system cancel code into register 5. Common control 6 detects the system cancel code and places a low signal on lead RCF1, FIG. 8, extending to central memory 1. This signal is delayed for approximately 250 microseconds and then placed on lead BYC1, FIG. 3 and 6, to clear flip-flops BY00 through BY15. The clearing of these flip-flops clears all digit stores and inhibits NAND gates BI00 through BI15 in order that all base and remote station stores may subsequently be selected by common control 6.

SUMMARY

It is obvious from the foregoing that the flexibility, economy, and efficiency of switching systems may be enhanced by the provision of a call forwarding system having a memory arranged to serially receive base station and selected remote station number pulse trains over digital leads and to record the received number digits in any idle store of the memory. It is further obvious from the foregoing that the aforesaid call forwarding system's unique feature of serially interrogating the memory stores by simultaneously comparing each digit pulse train of a called station number with each digit pulse train of a stored base station number and for serially reading the digits of a remote station number from a matched memory store, obviates the need for a multiplicity of parallel leads and for memory stores individually assigned to every base station.

While the equipment of our invention has been disclosed in an automatic telephone switching system wherein a call directed to a base telephone station may be established to a remote telephone station previously selected by the base station user, it is to be understood that such an embodiment is intended to be illustrative of the principles of our invention and that numerous other arrangements may be devised by those skilled in the art without departing from the spirit and scope of the invention.

What is claimed is:

1. A content addressable memory comprising
means for recording pulses of serial pulse trains,
means for selecting idle ones of said recording means,
means enabled by said selecting means for directing information ones and address ones of said serial pulse trains to said recording means,
means for simultaneously comparing pulses of an interrogating one of said serial pulse trains with the pulses of said address pulse trains stored in said recording means, and
means enabled by said comparing means detecting a match of said interrogating serial pulse train with one of said recorded address pulse trains for serially reading one of said information pulse trains corresponding to said matched address pulse train from said recording means.

2. The content addressable memory set forth in claim 1 wherein said recording means comprises
address means for counting and storing the pulses of said address pulse trains, and
storage means associated with said address means for counting and storing the pulses of said information pulse trains.

3. The content addressable memory set forth in claim 2 wherein said selecting means comprises
locating means for selecting an idle one of said address means and an idle one of said associated storage means.

4. The content addressable address memory set forth in claim 3 wherein said directing means comprises
first means responsive to said locating means for steering said information pulse trains to said selected storage means, and
second means responsive to said locating means for subsequently steering said address pulse trains identifying said information pulse trains to said selected address means.

5. The content addressable memory set forth in claim 4 wherein said comparing means comprises
means for enabling said address means to generate pulse trains corresponding to said address pulse trains stored therein,
means responsive to said enabling means and said interrogating pulse train for collating each pulse of said interrogating pulse train to each pulse of said generated address pulse trains, and
means enabled by said collating means and said enabling means for detecting a match of said interrogating pulse train with one of said generated address pulse trains.

6. The content addressable memory set forth in claim 5 wherein said reading means comprises
means responsive to said detecting means for activating said storage means associated with said address means storing said matched address pulse train to generate a serial train of pulses corresponding to said stored information pulse train stored therein, and
means responsive to said activating means for gating said serial train of pulses from said associated storage means.

7. A content addressable memory controlled call forwarding system comprising
address means for counting and storing pulses of address pulse trains,
storage means associated with said address means for counting and storing pulses of information pulse trains,
means for selecting idle ones of said address means and said associated storage means,
means enabled by said selecting means for directing said information pulse trains to said selected storage means and said address pulse trains to said selected address means,
means for simultaneously comparing pulses of an interrogating one of said address pulse trains with the pulses of said address pulse trains stored in all of said address means, and means enabled by said comparing means detecting a match of said interrogating address pulse train with one of said address pulse trains stored in said selected address means for serially reading one of said stored information pulse trains from said selected associated storage means.

8. A call forwarding switching system wherein stations each assigned a directory number may be interconnected by a controller responsive to directory number pulse trains comprising address means for counting and storing pulses of said directory number pulse trains, storage means associated with said address means for counting and storing pulses of said directory number pulse trains, means enabled by said controller for selecting idle ones of said address means and said associated storage means, means enabled by said selecting means for directing one of said directory number pulse trains identifying a first one of said stations to said selected storage means, means enabled by said selecting means for subsequently steering one of said directory number pulse trains identifying a second one of said stations to said selected address means, means enabled by a calling one of said stations for interrogating said address means by simultaneously comparing the pulses of a called one of said directory number pulse trains with pulses identifying said directory numbers stored in said address means, and means enabled by said interrogating means detecting a match of said called directory number pulse train with said second station directory number pulse train recorded in said selected address means for serially reading said first station directory number pulse train from said associated storage means into said controller.

9. The call forwarding system set forth in claim 8 wherein each of said address means and said associated storage means comprise counting means responsive to said directory number pulse trains for recording the sum of said pulses of said directory number pulse trains in predetermined ones of a fixed number of counting states.

10. The call forwarding system set forth in claim 9 wherein said selecting means comprises first logic means for indicating an idle status of one of said address means and said associated storage means, and second logic means responsive to said first logic means and sequentially enabled by said controller for signaling said controller of the selection of said one address means and said associated storage means.

11. The call forwarding system set forth in claim 10 wherein said directing means comprises first binary means having a set state for inhibiting said first logic means and a clear state for clearing said counting means of said idle address means and said associated storage means to an initial one of said counting states, first gating means for connecting said first station directory number pulse train to said counting means of said selected storage means, and second gating means enabled by said controller in combination with said second logic means for operating said first binary means from said clear state to said set state and for enabling said first gating means.

12. The call forwarding system set forth in claim 11 wherein said subsequently steering means comprises third gating means for connecting said second station directory number pulse train to said counting means of said selected address means, and fourth gating means responsive to said second logic means and said controller for enabling said third gating means.

13. The call forwarding system set forth in claim 12 wherein said interrogating means comprises means responsive to said controller for enabling said counting means of said address means to generate pulse trains corresponding to said directory number stored in said predetermined ones of said counting states and means responsive to said enabling means for associating one of said generated pulse trains to said called directory number pulse train.

14. The call forwarding system set forth in claim 13 wherein said enabling means comprises third logic means enabled by said controller for cycling said counting means of said address means from said predetermined ones of said counting states through said fixed number of counting states forward to said predetermined ones of said counting states, and second binary means enabled by said cycling counting means advancing through said initial counting state for generating pulse trains each having a number of pulses corresponding to the sum of said directory number pulse trains recorded in said cycling counting means.

15. The call fowarding system set forth in claim 14 wherein said associating means comprises comparison means enabled by said second binary means in combination with said controller for simultaneously comparing each pulse of said generated pulse trains to each pulse of said called directory number pulse train, detector means responsive to said comparsion means for ascertaining a mismatch of said called directory number pulse train with said generated pulse trains, and means inhibited by said detector means for signaling said controller that a match of said called directory number pulse train with one of said generated pulse trains has occurred.

16. The call forwarding system set forth in claim 15 wherein said signaling means comprises third binary means having a first state for indicating said match and a second state for indicating said mismatch, delay means enabled by said controller responding to said calling station for initially operating said third binary means to said first state, strobe means responsive to said third logic means in combination with said detector means for operating said third binary means to said second state to indicate said mismatch, and fifth gating means responsive to said third binary means in said first state for transmitting a signal representing said match to said controller.

17. The call forwarding system set forth in claim 16 wherein said reading means comprises cycling means enabled by said controller in combination with said first state of said third binary means for advancing said counting means of said associated storage means to originate pulses representing said first station directory number pulse train, and fourth logic means responsive to said cycling counting means and said controller for gating said originate pulses into said controller.

18. A call forwarding switching system wherein a controller responsive to serial pulse trains is arranged to transfer an incoming call directed to a base station number to a remote station identified by a remote station number arbitrarily chosen by a base station user comprising a plurality of remote station counters each arranged to count and store pulses of one of said serial pulse trains generated by said base station user and identifying said remote station number in one of a fixed number of counting states, a plurality of base station counters each associated with one of said remote station counters and each arranged to count and store pulses of one of said serial pulse trains identifying said base station number in one of said fixed number of counting states, logic means sequentially enabled by said controller for selecting an idle combination of one of said remote station counters and one of said associated base station counters, first directing means enabled by said logic means in combination with said controller for steering said base station user generated remote station number pulse train to said selected remote station counter, second directing means enabled by said logic means in combination with said controller for subsequently steering said identifying base station number pulse train to said selected base station counter, interrogating means enabled by said controller responding to an incoming one of said serial pulse trains identifying said base station for cycling said plurality of base station counters through said fixed number of counting states to generate trains of pulses corresponding to said serial pulse trains stored in said base station counters, match means enabled by said interrogating means for detecting a pulse-by-pulse match of said incoming serial pulse train with said train of pulses generated by said selected base station counter, read means enabled by said match means for cycling said selected remote station counter through said fixed number of counting states to generate serial pulses corresponding to said stored remote station number pulse train, and means enabled by said controller and said read means for gating said generated serial pulses into said controller.

19. A call forwarding attended telephone switching system wherein a controller responsive to serial pulse trains is arranged to transfer an incoming call directed to a base station teephone number to a remote station telephone identified by a remote station telephone number arbitrarily chosen by one of base station users and attendant station users comprising a plurality of remote station counters each arranged to count and store pulses of one of said serial pulse trains selectively dialed by said one station user and identifying said remote station telephone number in one of a fixed number of counting states, a plurality of base station counters each associated with one of said remote station counters and each arranged to count and store pulses of one of said serial pulse trains identifying said base station telephone number in one of said fixed number of counting states, logic means sequentially enabled by said controller for selecting an idle one of said remote station counters in combination with one of said associated base station counter, first directing means enabled by said logic means in combination with said controller for selectively connecting said one station user dialed remote telephone station number pulse train to said selected remote station counter, second directing means enabled by said logic means in combination with said controller for subsequently connecting said identifying base station telephone number pulse train to said selected base station counter, interrogating means enabled by said controller responding to an incoming one of said serial pulse trains identifying said base station for cycling said plurality of base station counters through said fixed number of counting states to generate trains of pulses corresponding to said serial pulse trains stored in said base station counters, match means enabled by said interrogating means for detecting a pulse-by-pulse match of said incoming serial pulse train with said train of pulses generated by said selected base station counter, read means enabled by said match means and said controller for cycling said selected remote station counter through said fixed number of counting states to generate serial pulses corresponding to said stored remote station number pulse train, gating means enabled by said controller and said read means for transmitting said generated serial pulses into said controller, and means selectively controlled by said one station user for canceling said remote telephone station pulse train and said base station telephone number pulse train stored in said remote station and said base station counters, respectively.

20. Thecall forwarding attended telephone switching system set forth in claim 19 wherein said canceling means comprises control means enabled by said match means in combination with said controller for setting said selected remote station and said selected base station counters to an initial one of said fixed number of counting states, and clearing means enabled by said controller responding to one of said attendant station users for setting both said plurality of remote station counters and said plurality of base station counters to said initial counting state.

* * * * *